T. C. HANCOCK.
COMBINED FREE WHEEL CLUTCH AND BACK PEDALING BAND BRAKE FOR CYCLES.
APPLICATION FILED APR. 13, 1908.
952,041.
Patented Mar. 15, 1910.
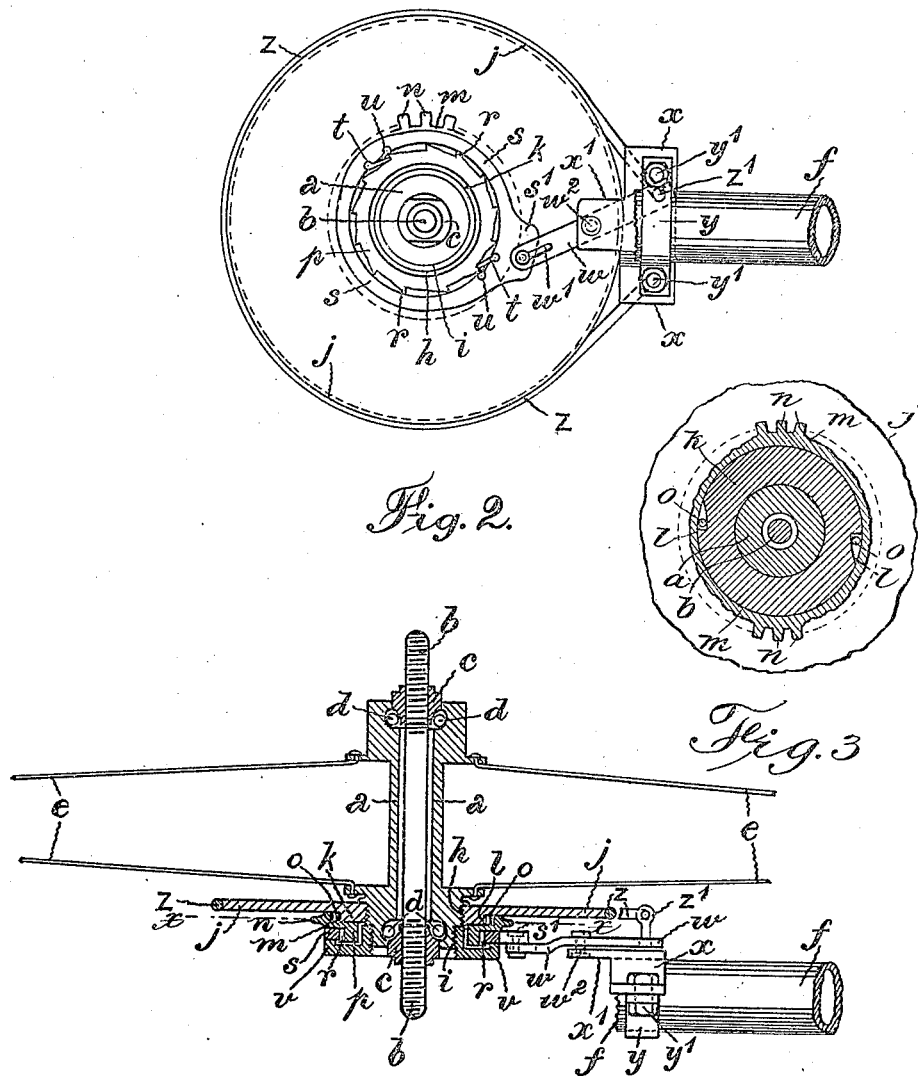

UNITED STATES PATENT OFFICE.

THOMAS CECIL HANCOCK, OF JOHANNESBURG, TRANSVAAL.

COMBINED FREE-WHEEL CLUTCH AND BACK-PEDALING BAND-BRAKE FOR CYCLES.

952,041. Specification of Letters Patent. Patented Mar. 15, 1910.

Application filed April 13, 1908. Serial No. 426,871.

*To all whom it may concern:*

Be it known that I, THOMAS CECIL HANCOCK, a subject of the King of Great Britain, and residing at 116 Main street, Marshall's township, Johannesburg, Transvaal, have invented certain new and useful Improvements in Combined Free-Wheel Clutches and Back-Pedaling Band-Brakes for Cycles, of which the following is a specification.

This invention relates to a new or improved combined free wheel clutch and back-pedaling band brake for bicycles, tricycles and other similar vehicles.

The invention has for its object to construct a combined free wheel clutch mechanism and back-pedaling band brake which may be fitted to ordinary or standard sized hubs.

The invention will be described in detail by aid of the accompanying drawing in which, Figure 1 represents the hub and portion of the frame of an ordinary free wheel bicycle with the invention applied thereto, and Fig. 2 is an elevation of Fig. 1 with the cap ($v$) removed. Fig. 3 is a sectional elevation of Fig. 1 on line $x$—$x$.

$a$ is the hub of the wheel and $b$ the spindle by which it is revolubly supported in the frame of the machine, $c$ being the cones and $d$ the balls of the ordinary ball bearing.

$e$ are the spokes of the wheel affixed at their inner ends to the spoke flanges of the hub $a$ and at their outer ends to the rim of the wheel in any suitable manner.

$f$ is a portion of one of the bottom stays or that part of the frame which extends from the spindle $b$ to the bottom bracket.

The hub $a$ on the driving side of the wheel is provided, as usual, with a right-hand screw-thread $h$ for a portion of its length and with a left hand thread $i$ on a reduced portion.

$j$ is a brake wheel of any suitable construction. The brake wheel $j$ has fixed to it or formed in one piece with it a boss $k$ which corresponds to that part of an ordinary clutch which is fixed to the hub of the wheel. The brake wheel $j$ and boss $k$ are screwed on to the right hand threaded portion $h$ of the hub $a$. This boss $k$ is formed on or affixed to the outside of the brake wheel $j$ and is formed with circumferential inclined recesses $l$.

$m$ is that portion of the clutch on which are formed the teeth $n$ engaged by the ordinary chain for propelling the vehicle. This member $m$ of the clutch is recessed on the inside and fits over the boss $k$ formed on the outside of the brake wheel $j$. Between the inclined circumferential recesses $l$ and the inside of the member $m$ of the clutch are located rollers or pawls $o$ which serve for driving the brake wheel $j$ and hub $a$ when the part $m$ is driven in the one direction, and allow the brake wheel $j$ and hub $a$ to rotate freely when the part $m$ is stationary. Any other suitable construction of clutch may be employed.

The part $m$ of the clutch on the outside is constructed with a boss $p$ on which are formed ratchet teeth $r$, (see Fig. 2) and surrounding this boss $p$ is a ring $s$ which carries two pawls $t$ adapted to engage the ratchet teeth $r$.

$u$ are springs for maintaining the pawls $t$ in contact with the ratchet teeth $r$.

$v$ is a cap which is screwed on the reduced left hand threaded portion $i$ of the hub $a$ and serves for keeping the several parts in position.

The ring $s$ is formed with a lug or projection $s^1$ to which is pivotally attached one end of lever $w$ formed with an elongated slot $w^1$ to allow for radial movement thereof.

To the stay $f$ is clamped a bracket $x$, $y$ being a clip and $y^1$ bolts or their equivalent for securing the bracket $x$ around the stay $f$. The bracket $x$ is formed with a projection $x^1$ on the inside to which the lever $w$ is pivoted at $w^2$.

$z$ is the brake band which encircles the greater portion of the circumference of the brake wheel $j$. One end of this brake band $z$ is preferably adjustably attached to the other end of the lever $w$ by means of an eyepiece $z^1$ or otherwise as preferred, and the other end of the brake band $z$ is preferably adjustably attached by a similar eyepiece or otherwise to the bottom of the bracket $x$. The bottom bolt $y^1$ may be conveniently used for the purpose.

It will be evident that in place of ratchet teeth $r$ and pawls $t$, any other suitable form of back-pedaling clutch may be employed between the parts $m$ and $s$.

To drive the wheel to propel the vehicle, forward movement is imparted to the part $m$ of the clutch through the driving chain and chain wheel in the ordinary manner. By holding the part $m$ of the clutch stationary through the medium of the pedals, chain wheel and chain, the wheel runs as an ordinary free wheel, the brake wheel $j$ and hub $a$ then rotating freely within the part $m$ of the clutch. The backward movement of either of the pedals rotates the part $m$ of the clutch in the opposite direction. This causes the ratchet teeth $r$ to engage the pawls $t$ and by partially rotating the ring $s$ moves the lever $w$ about its pivot $w^2$, and thereby tightens the band $z$ around the brake wheel $j$. When the part $m$ of the clutch is driving the wheel the ratchet teeth $r$ move freely over the pawls $t$.

What I claim as my invention and desire to protect by Letters Patent is:

1. In a device such as described, in combination, a hub, a free wheel clutch, one member of which is secured to the hub, a brake wheel attached to said member, a brake band around the brake wheel, fixed at one end, a ratchet wheel attached to the other member of the free wheel clutch, a ring around the ratchet teeth, a pawl carried by said ring engaging the teeth of the ratchet wheel, a frame, a bracket fixed to the frame, and a lever pivoted to said bracket, one end of the lever being slotted and pivotally connected with the ring and adjustably attached at the opposite end to the other end of the brake band.

2. In a device such as described, in combination, a hub having a right-hand threaded portion and a reduced left-hand threaded portion on the driving side, a free wheel clutch one member of which has a screw-threaded engagement with the right-hand threaded portion of the hub, a brake wheel attached to said member, a brake band around the brake wheel, fixed at one end to the frame of the cycle, a ratchet wheel attached to the other member of the free wheel clutch, a ring around the ratchet wheel, a pawl carried by said ring engaging the teeth of the ratchet wheel, a frame, a bracket fixed to the frame, a lever pivotally attached to said bracket, said lever having a slotted end pivotally connected with the ring, the other end of the lever being connected to the other end of the brake band, and a cap screwed on to the left-hand threaded portion of the hub for maintaining the several parts in position, as set forth.

3. In a device such as described, in combination, a hub having a right-hand threaded portion and a reduced left-hand threaded portion on the driving side, a free wheel clutch, one member of which has a screw-threaded engagement with the right-hand threaded portion of the hub, a brake wheel formed in one piece with said member, a brake band around the brake wheel fixed at one end to the frame of the cycle, a ratchet wheel formed in one piece with the other member of the free wheel clutch and on the outside thereof, a ring encircling said ratchet wheel, and formed with a projection, pawls carried by the ring in engagement with the ratchet wheel, springs for maintaining said pawls in contact with the teeth of the ratchet wheel, a frame, a bracket and a clip for clamping said bracket to the frame, said bracket having a lug, a lever pivoted to the lug on the bracket, said lever slotted at one end and pivotally attached to the projection on the ring, and an eyepiece, fixed to the other end of the lever, to which the other end of the brake band is attached, as set forth.

In witness whereof I have hereunto set my hand in the presence of two subscribing witnesses.

THOMAS CECIL HANCOCK.

Witnesses:
 CHAS. OVENDALE,
 R. OVENDALE.